US011975439B2

(12) United States Patent
Gubellini et al.

(10) Patent No.: US 11,975,439 B2
(45) Date of Patent: May 7, 2024

(54) BALANCER FOR TOOLS

(71) Applicant: TECNA S.P.A., Castel San Pietro Terme (IT)

(72) Inventors: Fabio Gubellini, Imola (IT); Damiano Bergami, Castel Guelfo di Bologna (IT)

(73) Assignee: TECNA S.P.A., Castel San Pietro Terme (IT)

( * ) Notice: Subject to any disclaimer, the term of this patent is extended or adjusted under 35 U.S.C. 154(b) by 374 days.

(21) Appl. No.: 17/611,413

(22) PCT Filed: May 6, 2020

(86) PCT No.: PCT/EP2020/062595

§ 371 (c)(1),
(2) Date: Nov. 15, 2021

(87) PCT Pub. No.: WO2020/229266

PCT Pub. Date: Nov. 19, 2020

(65) Prior Publication Data

US 2022/0234189 A1 Jul. 28, 2022

(30) Foreign Application Priority Data

May 15, 2019 (IT) ........................ 102019000006843

(51) Int. Cl.
*B66D 5/04* (2006.01)
*B25H 1/00* (2006.01)

(52) U.S. Cl.
CPC .................................. *B25H 1/0028* (2013.01)

(58) Field of Classification Search
CPC .......... B65H 75/483; B66D 5/04; B66D 3/20; B66D 3/26; B25H 1/00; B25H 1/0028
See application file for complete search history.

(56) References Cited

U.S. PATENT DOCUMENTS 3,499,330 A 3/1970 Bjorn et al.
4,443,888 A * 4/1984 Cutter .................... G01B 7/026 378/151
(Continued)

FOREIGN PATENT DOCUMENTS

CN 103635414 A 3/2014
GB 263185 A 8/1927
(Continued)

OTHER PUBLICATIONS

International Search Report dated Aug. 3, 2020 re: Application No. PCT/EP2020/062595, pp. 1-3.
(Continued)

*Primary Examiner* — Sang K Kim
(74) *Attorney, Agent, or Firm* — CANTOR COLBURN LLP

(57) ABSTRACT

A balancer for tools includes a rotary drum for winding and unwinding a cable; a return spring, which is wound around the rotation axis of the drum and is coupled thereto, for the development of an elastic reaction that contrasts the unwinding of the cable and is adapted to facilitate its rewinding; an adjustment assembly for adjusting the preloading of the spring.

The adjustment assembly includes a fixed annular gear with an internal set of teeth; a circular ring with an external set of teeth, arranged inside the annular gear; and a plate which is arranged substantially coplanar inside the ring. In every angular position of the plate, the ring is kept pressed against the internal set of teeth for the transmission of motion from the plate to the ring and the consequent adjustment of the preloading of the spring.

12 Claims, 6 Drawing Sheets

(56) References Cited

U.S. PATENT DOCUMENTS

| | | | | |
|---|---|---|---|---|
| 11,850,723 | B2 * | 12/2023 | Gubellini | B65H 75/486 |
| 2018/0117733 | A1 | 5/2018 | Steinle | |
| 2021/0299848 | A1 * | 9/2021 | Bergami | B66D 3/26 |

FOREIGN PATENT DOCUMENTS

| | | | |
|---|---|---|---|
| GB | 535884 | A | 4/1941 |
| GB | 1203803 | A | 9/1970 |
| JP | H06262544 | A | 9/1994 |

OTHER PUBLICATIONS

IT Search Report dated Jan. 29, 2020 re: Application No. IT 201900006843, pp. 1-24.

Written Opinion dated Aug. 3, 2020 re: Application No. PCT/EP2020/062595, pp. 1-5.

Chinese Office Action for Application No. 202080035032.9, dated Oct. 28, 2023, 5 pages.

* cited by examiner

BALANCER FOR TOOLS

TECHNICAL FIELD

The present disclosure relates to a balancer for tools.

BACKGROUND

As is known, in the state of the art (and in the present description) the term "balancer" identifies a device that is used in workshops and production areas, to provide assistance to an operator who uses a tool to carry out work of various nature.

In more detail, the balancer usually comprises a shell which is hung from the ceiling or a wall, and which internally accommodates a rotary drum around which a cable is wound; the cable is fixed at one end to the drum while at the other end it exits from the shell and presents a hook or a spring-clip, so that it can be attached to the tool. The balancer further has a spring, typically spiral, which is wound about the rotation axis of the drum: unwinding the cable, with consequent rotation of the drum and descent of the tool, generates a constraining reaction of the spring, which balances (or exceeds) the weight of the tool itself and performs a twofold function.

Firstly in fact, it reduces or cancels out the weight of the tool coupled to the cable, thus enabling the operator to handle it without effort. Furthermore, or alternatively, when the operator has finished work, the elastic reaction takes care of returning and optionally maintaining the tool in a rest station (proximate to the drum and to the wall where it is hung), when the operator releases it.

In some applications, the balancer enables the operator to adjust the preloading of the spring, so as to modify the intensity of the elastic reaction at will.

In particular, according to conventional methods the operator can adjust the preloading by rotating (by hand or using a key) a knob that protrudes from the shell and is connected directly or indirectly with the spring. In order to prevent the transmission of motion in the opposite direction (from the spring to the knob) and/or unwanted rotations of the knob, adjustment is permitted only after having deactivated a mechanical holdback or only by imposing a temporary translation (partial extraction) of the knob, since only in this condition is it coupled with the spring. In both cases, this is rather inconvenient for the operator, who has to have the necessary key with them, or has to rotate the knob while keeping it extracted, thus performing an unnatural and very inconvenient movement (which is complicated by the need to hold the shell still with the other hand). Even simply actuating the knob (either manually or with the key) is sometimes difficult, owing to the considerable operator effort that is required.

To keep the use experience of the balancer at a more practical level, in other applications the adjustment of the preloading is taken care of by an annular gear/endless screw coupling: as is known in fact, by adopting such components the movement can be transmitted in one direction only, and therefore the transmission of the motion in the opposite direction is automatically prevented.

Such implementation solution is also however not devoid of drawbacks. In fact, since it is necessary to have elements that operate on distant planes, such a gear set appreciably complicates the lay-out and space occupation of the balancer. Furthermore, this is a very costly solution and is suitable only for very large balancers.

SUMMARY

The aim of the present disclosure is to solve the above mentioned problems, by providing a balancer for tools that offers convenient methods of adjusting the preloading of the spring inside it.

Within this aim, the disclosure provides a balancer for tools that makes it possible to adjust the preloading of the spring ergonomically and without requiring significant effort by the user.

The disclosure also provides a balancer for tools that adopts contrivances that are useful for preventing or at least reducing unwanted movements of the spring and/or the risk of transmitting the motion in the opposite direction to the direction for adjusting the preloading.

The disclosure further provides a balancer that ensures a high reliability of operation.

The disclosure also provides a balancer for tools that adopts an alternative technical and structural architecture to those of conventional balancers.

The disclosure further provides a balancer that can be easily implemented using elements and materials that are readily available on the market.

The disclosure provides a balancer that is of low cost and safely applied.

This aim and these and other advantages which will become better apparent hereinafter are achieved by providing a balancer according to claim 1.

BRIEF DESCRIPTION OF THE DRAWINGS

Further characteristics and advantages of the disclosure will become better apparent from the description of two preferred, but not exclusive, embodiments of the balancer according to the disclosure, illustrated by way of non-limiting example in the accompanying drawings wherein.

DETAILED DESCRIPTION OF THE DRAWINGS

Figure 1:
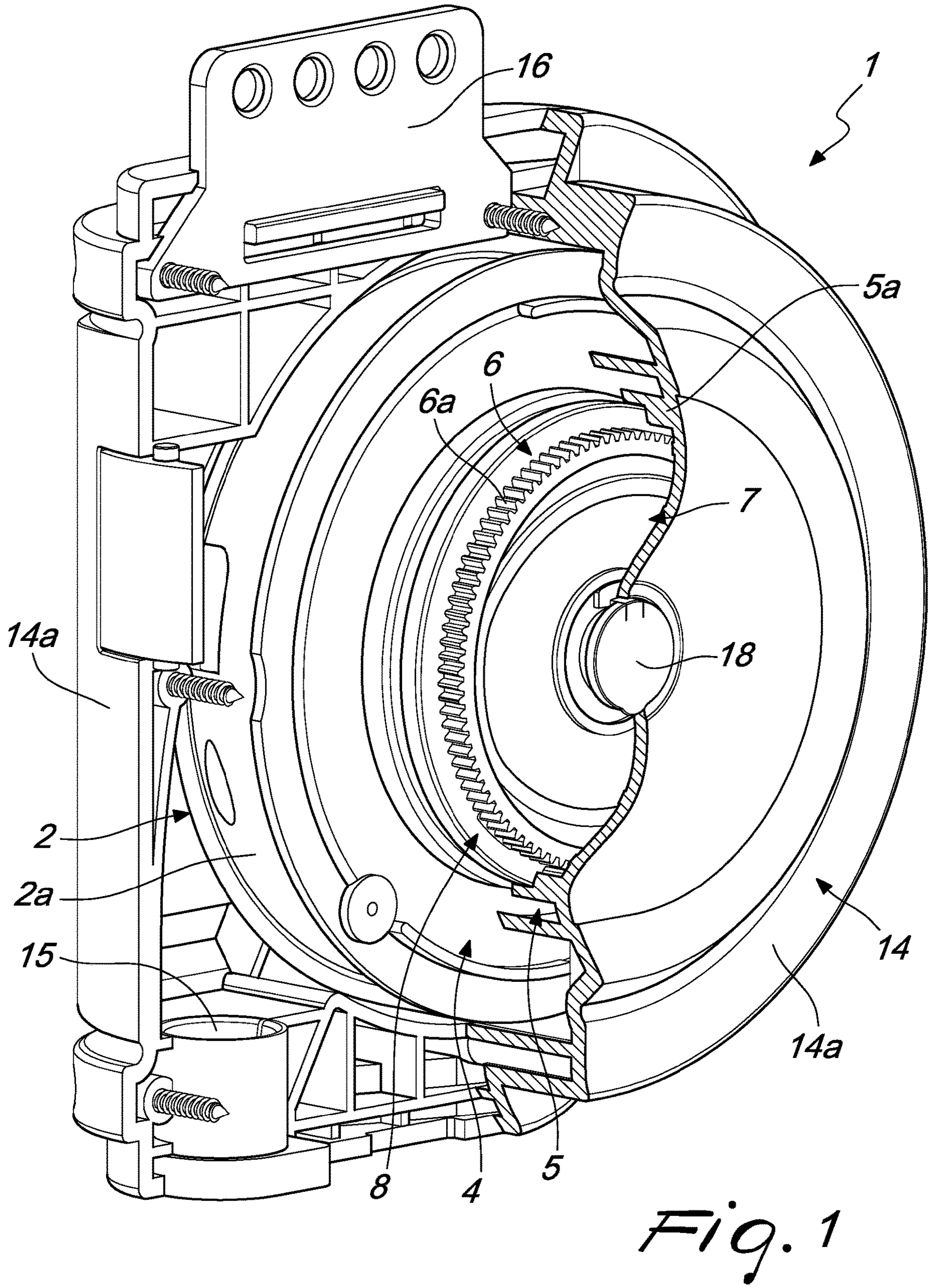
FIG. 1 is a partially cutaway perspective view of the balancer according to the disclosure, in first embodiment thereof.

With reference to the figures, the reference numeral 1 generally designates a balancer for tools, i.e. an apparatus that can be used to offer a useful aid to operators who need to carry out tasks of various kinds using a specific tool.

The balancer 1 comprises first of all a rotary drum 2 for winding and unwinding a cable, which is fixed or in any case coupled to the drum 2 with a first end thereof. The cable is configured with a free end thereof (at the end opposite to the first end) for supporting the tool. In other words, the cable can be wound almost completely around the drum 2, or partially or completely unwound (up to almost all of its length) in order to support/hold a tool hung from the free end, for example using a spring-clip, a hook, or other, similar coupling means. When it is wound about the drum 2, the cable can be contained in a receptacle 2*a* defined by the lateral surface of the drum 2, which can be cylindrical (as in the accompanying figures) or conical/frustum-shaped, or the like, while remaining within the scope of protection claimed herein.

Figure 5:
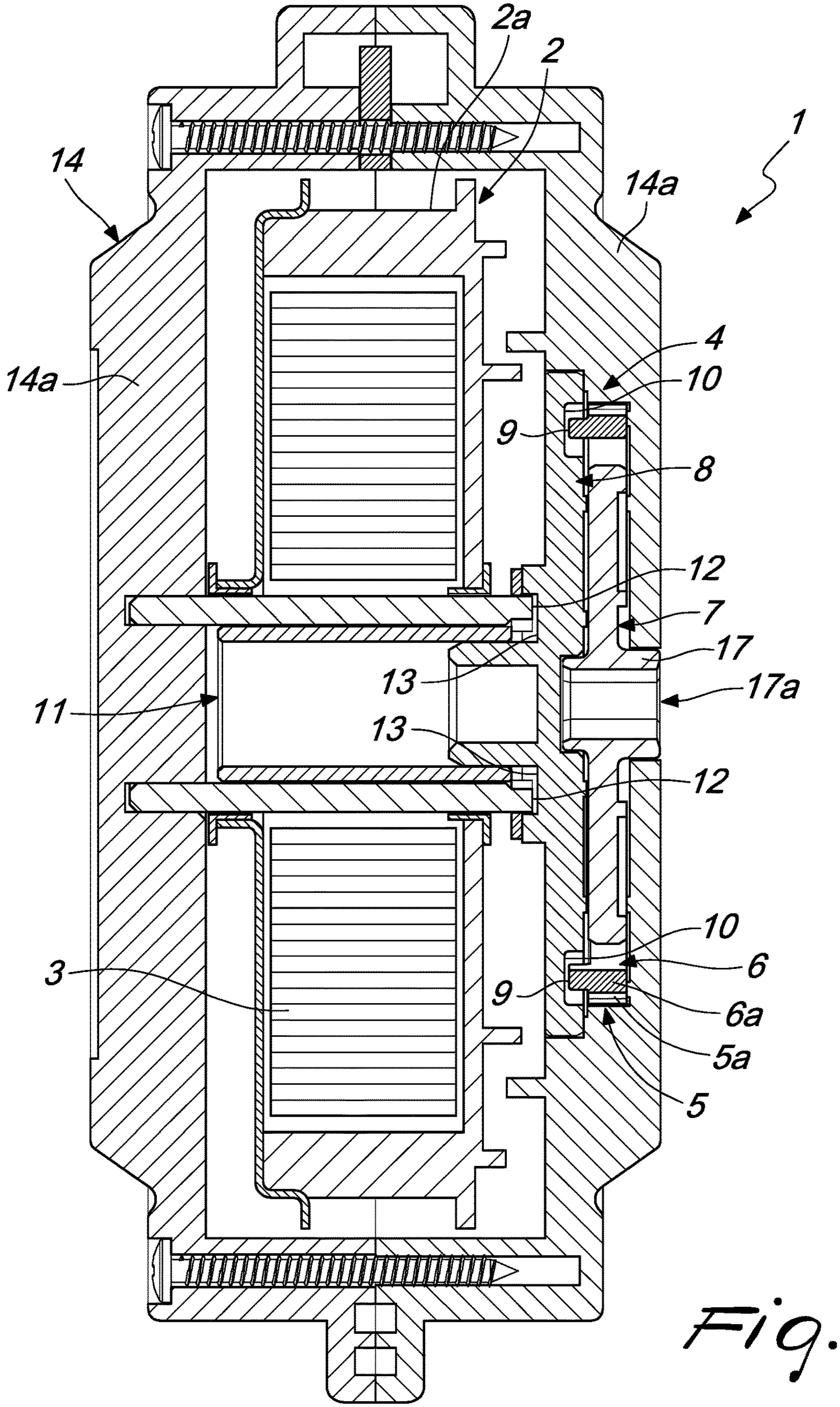
FIG. 5 is a cross-sectional view of the balancer in FIG. 1, taken along the line V-V in FIG. 4.

Furthermore, the balancer 1 comprises a preloaded return spring 3 which is wound about the rotation axis of the drum 2 and is directly or indirectly coupled thereto. The spring 3 (visible in FIG. 5) is typically a spiral spring (although other implementation solutions are not ruled out). By virtue of the coupling to the drum 2, the spring 3 develops an elastic reaction (as a result of the unwinding of the cable and of the consequent rotation of the drum 2) which contrasts the very unwinding of the cable and is adapted to facilitate its rewinding (in that, obviously, it tends to make the drum 2 rotate in the opposite direction).

According to various methods, and as a function of the specific application and use of the balancer 1, typically the rewinding takes place at the end of use of the tool.

The balancer 1 further comprises an adjustment assembly 4 for adjusting the preloading of the spring 3, in order to allow an operator to selectively vary the intensity of the elastic reaction developed.

Up to this point, the balancer 1 is of the conventional type and can indeed be used (preferably but not exclusively) to offer valuable assistance to operators who need to carry out tasks of a various nature while availing of a tool (to be hung from the free end of the cable).

According to the disclosure, the adjustment assembly 4 comprises first of all a fixed annular gear 5 with an internal set of teeth 5*a*.

Figure 4:
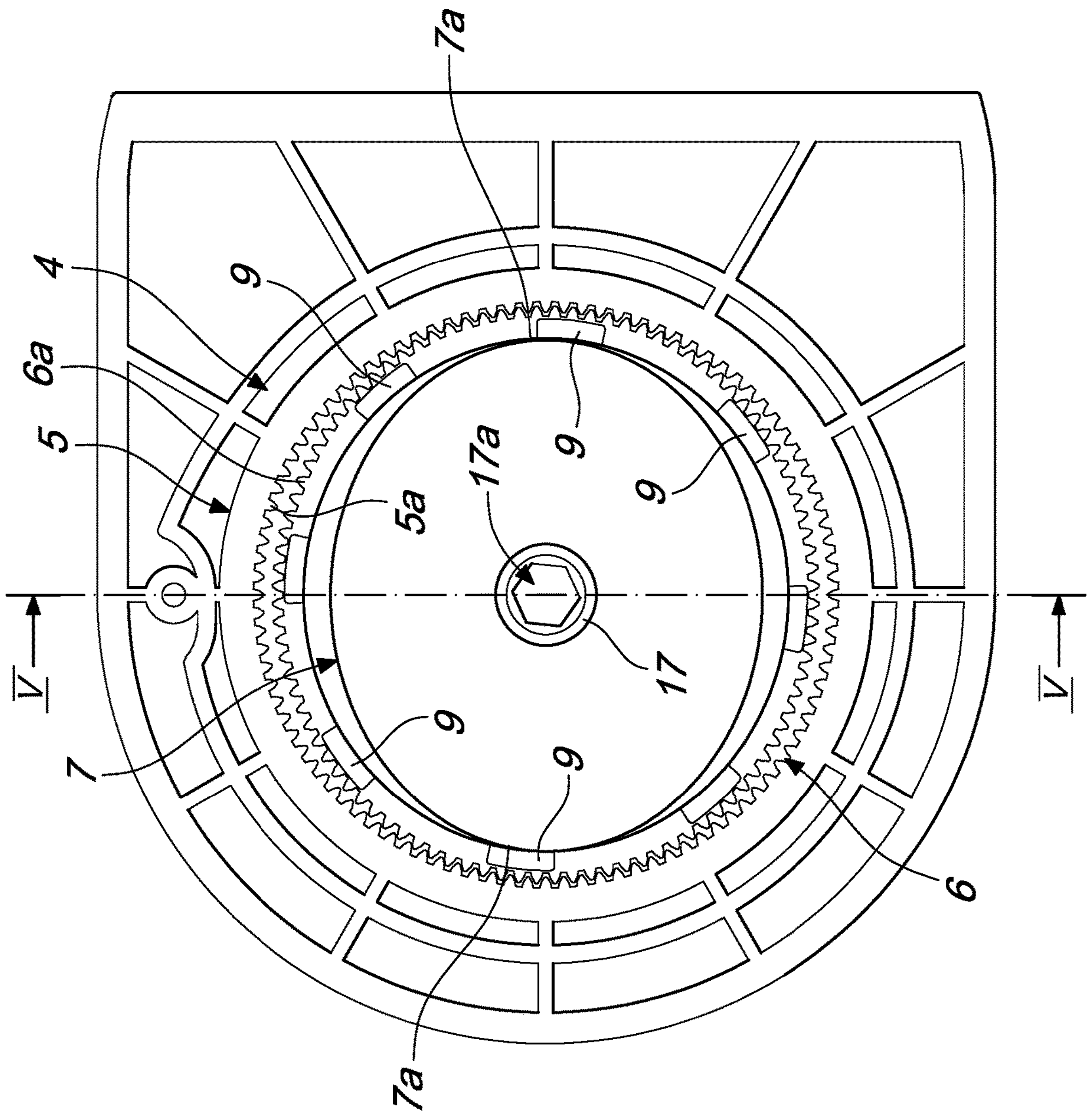
FIG. 4 is a front elevation view of the adjustment assembly and the annular gear, in the first embodiment.
Figure 6:
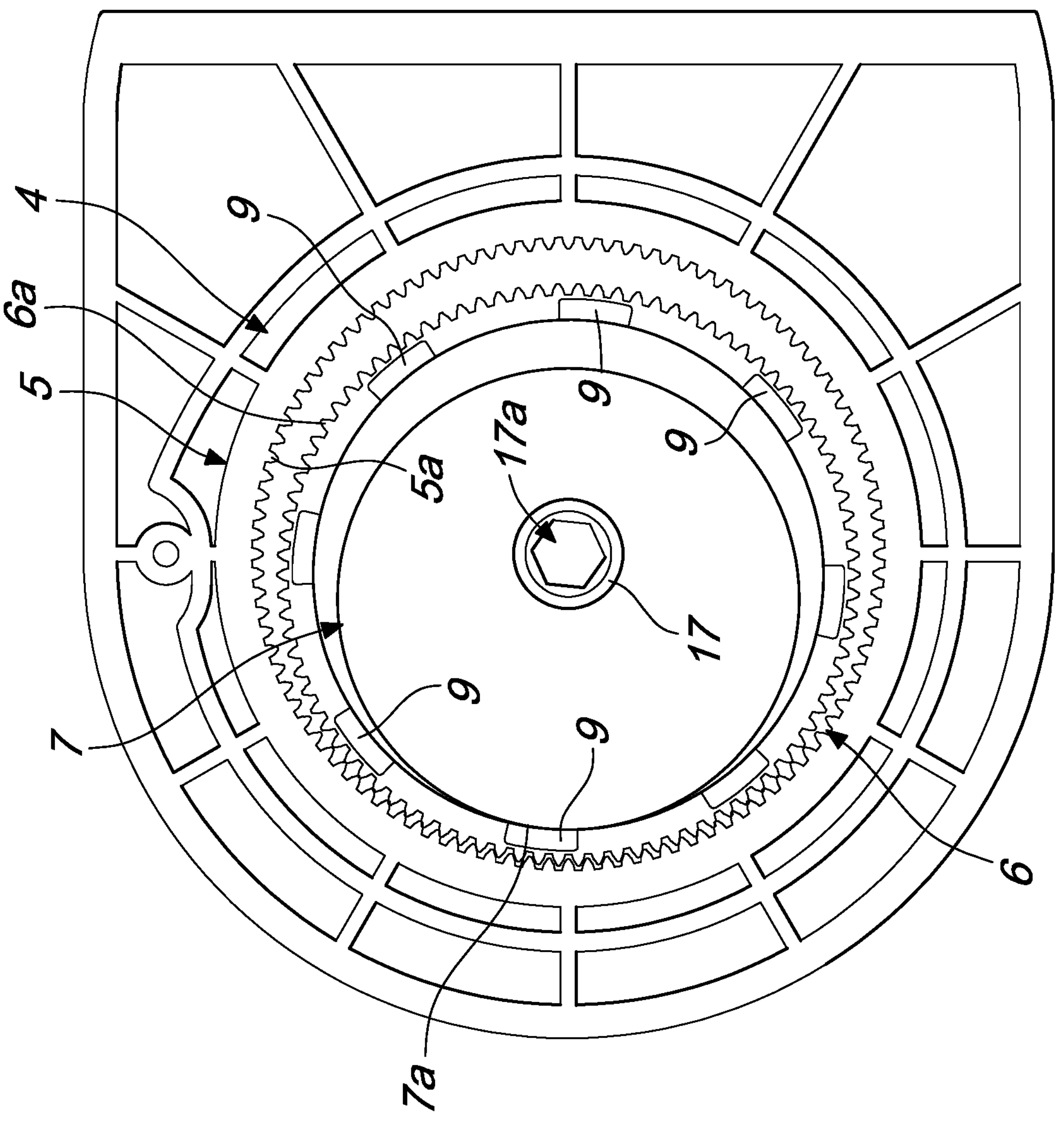
FIG. 6 is a front elevation view of the adjustment assembly and the annular gear, in a second embodiment thereof.

The assembly 4 further comprises a substantially circular ring 6 with external set of teeth 6*a*, which is arranged inside the annular gear 5 in a substantially coplanar manner (as can be clearly seen in FIGS. 4 and 6 for example).

The assembly 4 further comprises a plate 7 which is arranged substantially coplanar inside the ring 6 and is free to rotate about the longitudinal axis A of the annular gear 5 by the action of a user.

In every angular position of the plate 7 (each one of which can be obtained with the rotation about the longitudinal axis A), the ring 6 is kept pressed, with at least one respective section of the external set of teeth 6*a*, against the internal set of teeth 5*a* by a corresponding active portion 7*a* of the plate 7 with a larger radial extension, with respect to the longitudinal axis A. In this manner, the sets of teeth 5*a*, 6*a* mesh and this ensures the transmission of motion from the plate 7 to the ring 6 and the consequent adjustment of the preloading of the spring 3, which is functionally connected to the ring 6.

As will become better apparent below, the accompanying FIGS. 1-5 show an embodiment in which the plate 7 has two active portions 7*a*, whose reference numeral is shown only in FIG. 4, where they are most apparent. The number of active portions 7*a* can in any case be different, as a function of the specific form given to the plate 7: FIG. 6 schematically shows a possible variation in which the plate 7 has a single active portion 7*a*. In any case, in any embodiment only part of the external set of teeth 6*a* will at any moment be meshing with the internal set of teeth 5*a* and in particular the number of sections of the external set of teeth 6*a* that are kept pressed against the internal set of teeth 5*a* will be equal to the number of active portions 7*a* (and, as a consequence, the number of teeth that are meshing from moment to moment will vary).

By "section" of the external set of teeth 6*a* is obviously meant a segment of the set of teeth (never the entire set), of any dimension and which comprises any number of teeth, although, in the use that will be made of this term in the present discussion, preferably each section will have a limited number of teeth (the exact value will depend on the construction choices and on the dimensions of the components involved).

The plate 7 therefore has a variable extension, if measured along different radial directions with respect to the longitudinal axis A, and in particular at its active portion(s) 7*a* the outer edge arrives proximate to the internal set of teeth 5*a* of the annular gear 5. Thus, when the user causes the rotation of the plate 7 about its own longitudinal axis A, the respective section of the external set of teeth 6*a* of the ring 6 that is in contact with each active portion 7*a* from moment to moment is pushed toward the internal set of teeth 5*a*, thus achieving the meshing that is necessary for the transmission of motion.

The meshing always and only involves a part of the teeth of the sets of teeth 5*a*, 6*a*, and this makes it possible to obtain transmission ratios of great applicative interest and, more generally, numerous technical benefits.

In fact, the assembly 4 ensures, first of all, the desired ability to adjust the preloading of the spring 3, and this is obtained with a very practical solution (it is sufficient to force the rotation of the plate 7, which transmits motion to the ring 6 which is connected to the spring 3), which automatically achieves another important result. The peculiar type of gear set adopted in the assembly 4, with the meshing that occurs via the rotation of the plate 7 which progressively pushes sections that differ from moment to moment of the external set of teeth 6*a* into contact with the internal set of teeth 5*a*, automatically prevents the possibility of transmitting the motion in the opposite direction (from the spring 3 and from the ring 6 to the plate 7).

In a first embodiment, which is also shown in the accompanying FIGS. 1-5 purely for the purposes of non-limiting example of application of the disclosure, the plate 7 is substantially elliptical and is arranged coaxially with respect to the ring 6 and to the annular gear 5. In such embodiment therefore, the plate 7 has two active portions 7*a*, which are arranged on opposite sides along its major axis (and which in fact are the portions whose edges are spaced furthest apart from the longitudinal axis A and closest to the internal set of teeth 5*a* of the annular gear 5). The two active portions 7*a* keep two respective sections (which differ from moment to moment) of the external set of teeth 6*a* of the ring 6 pressed against the internal set of teeth 5*a* of the annular gear 5*a*.

In a second embodiment (FIG. 6), the plate 7 has a substantially circular shape and is arranged eccentrically with respect to the longitudinal axis A of the annular gear 5. Evidently, in such case the plate 7 has a single active portion 7*a*, on the opposite side with respect to the longitudinal axis A and along the ideal segment that joins the center of symmetry of the plate 7 and the point, along the longitudinal axis A, about which the plate 7 rotates. The single active portion 7*a* keeps a respective section (which differs from moment to moment) of the external set of teeth 6*a* of the ring 6 pressed against the internal set of teeth 5*a* of the annular gear 5*a*.

It is in any case appropriate to emphasize that the plate 7 can also have other shapes and have a different number of active portions 7*a*, according to the specific applicative requirements, while remaining within the scope of protection claimed herein.

In an embodiment of the disclosure of significant practical interest (particularly but not exclusively adapted to the embodiment that has an elliptical plate 7), the ring 6 is made of elastically deformable material and is arranged coaxially with respect to the annular gear 5. In the non-deformed configuration of the ring 6, the external set of teeth 6*a* is kept completely spaced apart from the internal set of teeth 5*a* of the annular gear 5. In other words, the dimensions of the ring 6 and of the annular gear 5 are chosen to be such that, between them, in the non-deformed configuration of the ring 6, there is always an empty gap and therefore no meshing occurs between the sets of teeth 5*a*, 6*a*. Effectively however, the non-deformed configuration never occurs in use, since in every angular position of the plate 7 the ring 6 is elastically deformed and kept pressed, with each respective section of the external set of teeth 6*a*, against the internal set of teeth 5*a* by the corresponding active portion 7*a*.

It is emphasized that the assembly made up of the elliptical plate 7, the annular gear 5 and the elastically deformable ring 6 effectively constitute the gear set known in the sector as a "harmonic reduction gear" or a "Harmonic Drive" (which is a registered trademark). This is the choice that is illustrated in the accompanying FIGS. 1-5.

In a different embodiment of significant practical interest (particularly but not exclusively adapted to the embodiment that has a circular plate 7), the ring 6 can translate freely on a plane that is perpendicular to the longitudinal axis A. This possibility can be conferred to the ring 6 with various constructive choices, which can be identified by the skilled person, according to the specific practical requirements and with no inventive effort, from those known in the prior art. In this way, in every angular position of the plate 7 the ring 6 (which is made of non-deformable material) is pushed and kept pressed, with the respective section of the external set of teeth 6*a*, against the internal set of teeth 5*a* by the corresponding active portion 7*a*.

In this case too, in an ideal configuration of rest the ring 6 is concentric to the annular gear 5 and the external set of teeth 6*a* is kept completely spaced apart from the internal set of teeth 5*a* of the annular gear 5. Once again however, the ideal configuration never occurs in use, since in every angular position of the plate 7 the ring 6 is pushed (translated) and kept pressed, with the respective section of the external set of teeth 6*a*, against the internal set of teeth 5*a* by the corresponding active portion 7*a*. The embodiment that has a circular plate 7 and a ring 6 that can translate freely is shown schematically in the accompanying FIG. 6.

However, the possibility is not ruled out of adopting other practical solutions for the ring 6, other than the two just described, while remaining within the scope of protection claimed herein.

Advantageously, as also shown in the solutions in the accompanying figures, the annular gear 5 and the plate 7 are arranged coaxially with respect to the drum 2 and to the spring 3 (the rotation axis of the drum 2 coincides with the longitudinal axis A). Such solution (preferred but not exclusive) makes it possible to contain the encumbrances of the balancer 1 by simplifying its lay-out.

Usefully, the internal set of teeth 5*a* of the annular gear 5 has a number of teeth that is greater than the number of teeth of the external set of teeth 6*a* of the ring 6, and preferably the difference between the number of teeth of the sets of teeth 5*a*, 6*a* is comprised between 1 and 5 and even more preferably is equal to 2.

It should be noted that, at least in the case of the harmonic reduction gear, the transmission ratio is obtained from the ratio of the difference between the number of teeth of the sets of teeth 5*a*, 6*a* to the number of teeth of the external set of teeth 6*a*.

So by adopting, for example, a ring 6 with an external set of teeth 6*a* of 200 teeth and an annular gear 5 with an internal set of teeth 5*a* of 202 teeth, it is possible to obtain a transmission ratio equal to 2/200.

Such transmission ratio (as with other similar ratios, for example between 1/200 and 10/200), elicit high practical interest, in that a complete rotation of the ring 6 occurs only with a very high number of complete rotations of the plate 7 (or, by contrast, one or two complete rotations of the plate 7 imparted by the user result in small rotations of the ring 6).

Transmission ratios like the ones just described, so far from unity, contribute to preventing the transmission of motion in the opposite direction (and therefore from the spring 3 and from the ring 6 to the plate 7), thus increasing the utility and practicality of the disclosure.

In an embodiment of significant practical interest, which in any case does not limit the application of the disclosure, the assembly 4 comprises transmission means that are configured for the rigid connection of the ring 6 to a terminal portion of the spring 3.

The rotation of the plate 7 imparted by the user therefore results in the rotation of the ring 6 (according to the predefined transmission ratio) and therefore the integral movement of the terminal portion of the spring 3, in order to vary its preloading.

More specifically, the transmission means comprise a disk 8 which coaxially faces the ring 6. A plurality of first teeth 9 (clearly visible for example in FIG. 2) extend axially from the ring 6 and are distributed (preferably equidistant) about the longitudinal axis A and are inserted into respective recesses 10 which are provided along one face of the disk 8 (FIG. 3), in order to obtain rigid coupling between the disk 8 and the ring 6.

Figure 2:
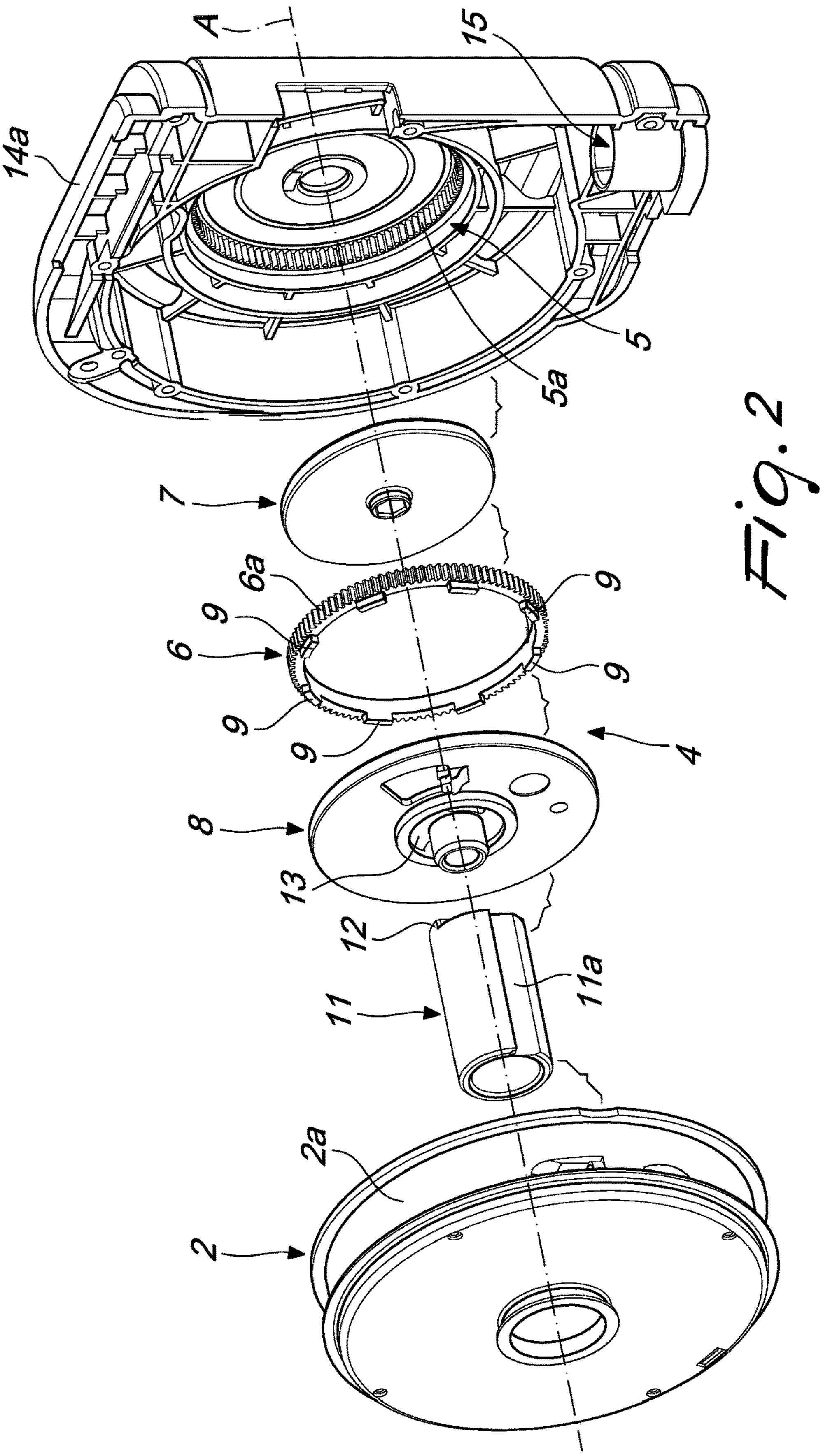
FIGS. 2 and 3 are exploded perspective views from opposite sides of some components of the balancer, in the first embodiment.
Figure 3:
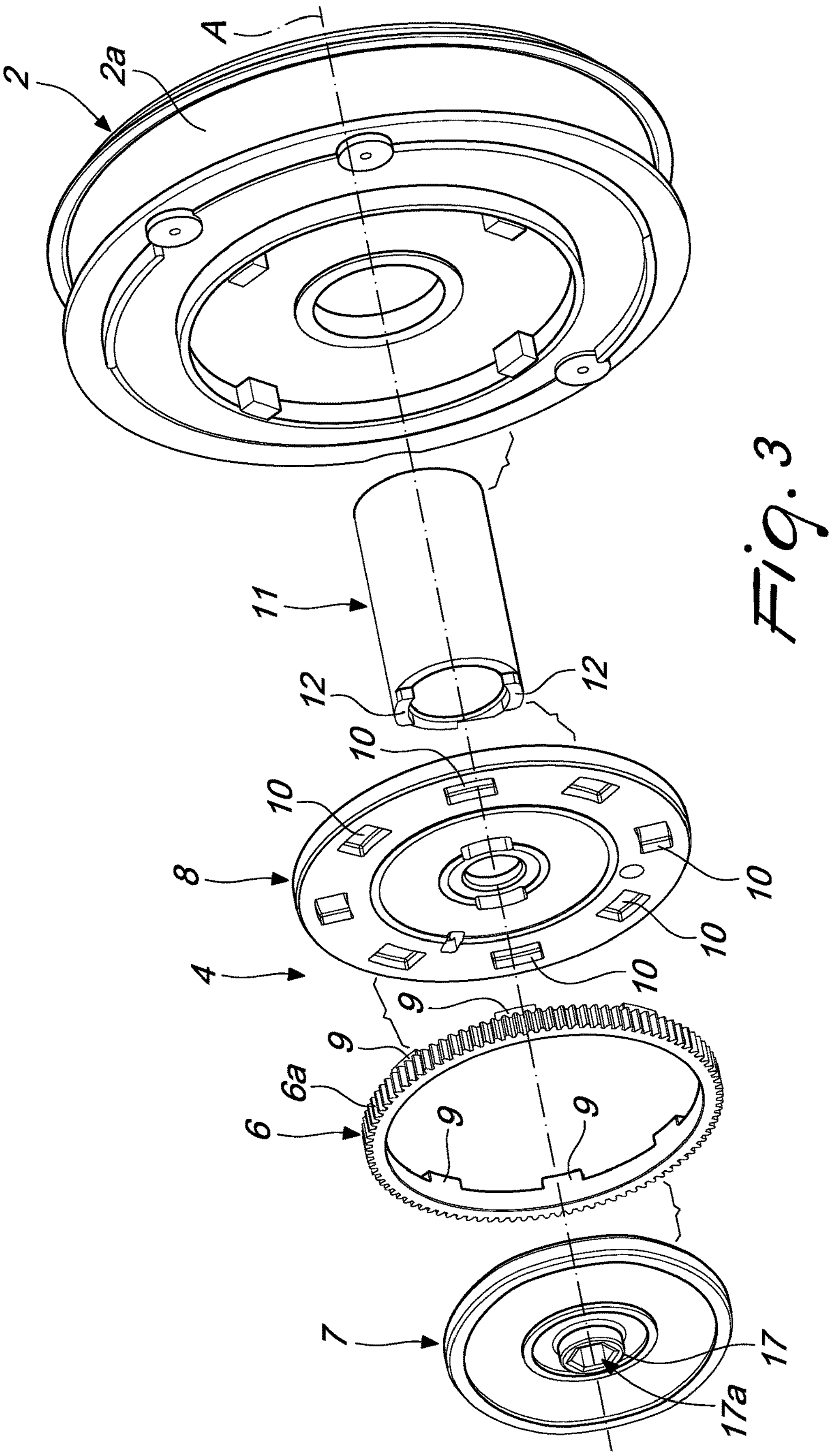

Even more specifically, the transmission means comprise a cylindrical sleeve 11 which is arranged coaxially with respect to the disk 8 (on the opposite side from the ring 6, as can be seen in FIGS. 2 and 3) and which has a longitudinal slot 11*a* (FIG. 2) for accommodating the previously-mentioned terminal portion of the spring 3. Second teeth 12 protrude coaxially from one edge of the sleeve 11: in the solutions in the accompanying figures, and as can be seen in FIG. 3 in particular, the sleeve 11 has two second teeth 12, but there can be any number thereof. The second teeth 12 are inserted into respective recesses 13 (FIG. 5) which are provided along the disk 8, in order to provide rigid coupling between the latter and the sleeve 11.

So in fact, when the user rotates the plate 7 it results in the corresponding rotation of the ring 6 (according to the predefined transmission ratio), which is rendered integral with the disk 8 by the first teeth 9 inserted in the recesses 10; by virtue of the second teeth 12 inserted in the recesses 13, with the disk 8 rotates integral with the sleeve 11 (which is inserted in the drum 2 so that it can rotate) and this makes it possible to vary the preloading of the spring 3, in that the sleeve 11 entrains in rotation the terminal portion thereof which is accommodated in the slot 11*a*. However, the possibility is not ruled out of coupling the sleeve 11 directly to the ring 6, or of interposing components other than the disk 8.

In an embodiment of significant practical interest, which in any case does not limit the application of the disclosure, the balancer 1 comprises an external shell 14 which internally accommodates at least the drum 2, the spring 3, the ring 6 and the plate 7 (preferably the disk 8 and the sleeve 11 are also accommodated in the shell 14). Usefully, the annular gear 5 is constituted substantially by a portion of the shell 14.

The shell 14 (which for example is formed by two half-shells 14*a* that are mutually anchored, as in the accompanying figures) defines an opening 15 for the egress and the unwinding of the cable; furthermore, a lug 16 is anchored to the shell 14 (at the opposite end from the opening 15), and is conveniently perforated so that the balancer 1 can be hung from the ceiling or a wall.

It should be noted that the ways in which the plate 7 is made to rotate by the user can be any, and for example a shaft and/or a knob can protrude from the shell 14, which are integral with the plate 7 and can be grasped directly by the user.

In the embodiments of the accompanying figures, which are shown purely for the purposes of non-limiting example, the plate 7 is provided with a shank 17 which internally defines a contoured receptacle 17*a* which is open outward. The contoured receptacle 17*a* is normally closed by a removable plug 18 (to protect it from dust and other impurities) and is configures for temporary coupling with a key (for example an Allen key) for actuating the rotation of the plate 7.

Operation of the balancer according to the disclosure is the following.

According to methods that are known per se, the balancer 1 can be hung from the ceiling (or from a wall) of a room in which an operator wishes to avail of a tool of any kind, which is then coupled temporarily to the free end of the cable. The cable can in turn be unwound at least partially from the drum 2 in order to be brought with its free end to the designated work area.

The elastic reaction of the spring 3, consequent to the unwinding of the cable and to the rotation of the drum 2, reduces or cancels out the weight of the tool, thus facilitating its use. Furthermore, or as an alternative, the elastic reaction of the spring 3 acts to return the tool to a rest station, when it is released by the operator.

In such context, the assembly 4 ensures the possibility of adjusting the preloading of the spring 3 in a completely innovative way.

It has in fact already been seen that the assembly 4 adopts a particular method of transmitting motion (and therefore of actuating the variation of the preloading), which requires the user simply to cause the rotation of the plate 7 (directly or using keys, shafts, knobs or other instruments that are integral therewith, which protrude from the shell 14). With the movement of the plate 7, the active portion or portions 7*a* push corresponding sections of the external set of teeth 6*a* (which differ from moment to moment) against the internal set of teeth 5*a* of the fixed annular gear 5. In this way the rotation is obtained of the ring 6 (with a transmission ratio chosen at will, and preferably equal to a few hundredths of unity), which is arranged directly or indirectly (as in the solutions in the accompanying figures) in operative connection with the spring 3, and which therefore can vary its preloading. As has been seen, the plate 7 and the ring 6 can be provided with different shapes, materials and relative positions (thus varying the number of active portions 7*a* and of corresponding sections of the external set of teeth 6*a* that are in contact with the internal set of teeth 5*a*), obtaining for example (but not exclusively) the two embodiments illustrated in the accompanying figures and described in the foregoing paragraphs.

Differently from known solutions which require more complex maneuvers of the user, the adjustment of the preloading of the spring 3 in the balancer 1 according to the disclosure involves imparting a simple rotation of the plate 7 about the longitudinal axis A and is therefore practical, easy and ergonomic. The lay-out can be kept very simple and the balancer 1 can thus present contained dimensions. By adopting transmission ratios such as those indicated in the foregoing description, the effort required by the user to actuate the adjustment of the preloading will be minimal.

Furthermore, precisely by virtue of the peculiarity of the gear set adopted, as pointed out previously the assembly 4 automatically prevents unwanted movements of the spring 3 and/or the risk of transmitting the motion in the opposite direction to the direction for adjusting the preloading, thus achieving an equally important result. The assembly 4 includes components that can be easily assembled and therefore it is absolutely indicated also for balancers 1 that are to be marketed at low cost.

The plate 7 can therefore be kept constantly coupled with the spring 3 without having to provide particular contrivances (like the holdbacks adopted in some conventional solutions) in order to prevent unwanted movements of the spring 3 and without having to partially extract the knob before rotation (in order to enable the adjustment only temporarily, as happens in other conventional solutions).

The disclosure, thus conceived, is susceptible of numerous modifications and variations, all of which are within the scope of the appended claims. Moreover, all the details may be substituted by other, technically equivalent elements.

In the embodiments illustrated, individual characteristics shown in relation to specific examples may in reality be substituted with other, different characteristics, existing in other embodiments.

In practice, the materials employed, as well as the dimensions, may be any according to requirements and to the state of the art.

The disclosures in Italian Patent Application No. 102019000006843 from which this application claims priority are incorporated herein by reference.

The invention claimed is:

1. A balancer for tools comprises:

a rotary drum for winding and unwinding a cable, which is configured with a free end thereof to support a tool, a return spring, which is wound around the rotation axis of said drum and is coupled to said drum, for development of an elastic reaction that contrasts an unwinding of said cable and is adapted to facilitate a rewinding thereof, an adjustment assembly for adjusting a preloading of said return spring, for the selective variation of the intensity of said elastic reaction, wherein said adjustment assembly comprises:

a fixed annular gear with an internal set of teeth, a substantially circular ring with an external set of teeth, arranged inside said annular gear in a substantially coplanar manner, a plate which is arranged substantially coplanar inside said circular ring and is free to rotate about the longitudinal axis of said annular gear by the action of a user, in every angular position of said plate said circular ring being kept pressed, with at least one respective said section of said external set of teeth, against said internal set of teeth by a corresponding active portion of said plate with a larger radial extension, with respect to said longitudinal axis, for a transmission of motion from said plate to said circular ring and a consequent adjustment of the preloading of said return spring, which is functionally connected to said circular ring.

2. The balancer according to claim 1, wherein said plate has a substantially elliptical contour and is arranged coaxially with respect to said circular ring and to said annular gear, said plate having two of said active portions, arranged on opposite sides along a major axis thereof.

3. The balancer according to claim 1, wherein said plate has a substantially circular contour and is arranged eccentrically with respect to said longitudinal axis of said annular gear.

4. The balancer according to claim 1, wherein said circular ring is made of elastically deformable material and is arranged coaxially with respect to said annular gear, in a non-deformed configuration of said circular ring said external set of teeth being kept completely spaced apart from said internal set of teeth of said annular gear, in every said angular position of said plate said circular ring being elastically deformed and kept pressed, with said at least one respective section of said external set of teeth, against said internal set of teeth by said corresponding active portion.

5. The balancer according to claim 1, wherein said circular ring is configured to translate freely on a plane that is perpendicular to said longitudinal axis, in every said angular position of said plate said circular ring being pushed and kept pressed, with said at least one respective section of said external set of teeth, against said internal set of teeth by said corresponding active portion.

6. The balancer according to claim 1, wherein said annular gear and said plate are arranged coaxially with respect to said drum and to said return spring.

7. The balancer according to claim 1, wherein said internal set of teeth of said annular gear has a number of teeth that is greater than a number of teeth of said external set of teeth of said circular ring, a difference between the number of teeth of said sets of teeth being comprised between 1 and 5.

8. The balancer according to claim 1, wherein said assembly comprises transmission means which are configured for a rigid connection of said circular ring to a terminal portion of said return spring.

9. The balancer according to claim 8, wherein said transmission means comprise a disk which coaxially faces said circular ring, a plurality of first teeth extending axially from said circular ring and being distributed around said longitudinal axis and inserted into respective recesses which are provided along one face of said disk, for rigid coupling between said disk and said circular ring.

10. The balancer according to claim 9, wherein said transmission means comprise a cylindrical sleeve which is arranged coaxially with respect to said disk and is provided with a longitudinal slot for accommodating said terminal portion of said return spring, second teeth protruding coaxially from one edge of said sleeve and being inserted into respective recesses which are provided along said disk, for rigid coupling between said disk and said sleeve.

11. The balancer according to claim 1, further comprising an external shell which accommodates at least said drum, said return spring, said circular ring, and said plate, said annular gear being substantially constituted by a fraction of said shell.

12. The balancer according to claim 1, wherein said plate has a shank which internally defines a contoured receptacle which is open outward and is normally closed by a removable plug and is configured for temporary coupling with a key for actuating rotation of said plate.

* * * * *